July 2, 1963 M. GARDINER 3,096,493

FOUR-TERMINAL ELECTRIC NETWORKS

Filed July 19, 1960 2 Sheets-Sheet 1

INVENTOR
MAURICE GARDINER
BY
Kirschstein, Kirschstein & Ottinger
ATTORNEYS

INVENTOR
MAURICE GARDINER
BY
Kirschstein, Kirschstein & Ottinger
ATTORNEYS 3,096,493
Patented July 2, 1963

3,096,493

FOUR-TERMINAL ELECTRIC NETWORKS

Maurice Gardiner, Coventry, England, assignor to The General Electric Company Limited, London, England Filed July 19, 1960, Ser. No. 43,832
Claims priority, application Great Britain July 23, 1959
6 Claims. (Cl. 333—75)

This invention relates to four-terminal electric networks.

In carrier communication systems, it is known to use a bridged-T network for the purpose of phase equalisation, such a bridged-T network being formed entirely of lumped impedance elements. However, at radio frequencies and in particular at microwave frequencies, it is a matter of some difficulty to manufacture a satisfactory bridged-T network and one object of the present invention is to provide an equivalent network which may more readily be realised.

In a four-terminal electric network according to the present invention, first and second lengths of transmission line are connected in parallel between the pairs of input and output terminals of the network, a third length of transmission line is connected to the said second line as a stub, and each of the said first and third lines and each part of the said second line on either side of the junction with the said third line has one or more lumped impedance elements connected thereacross, the arrangement being such that the network is electrically equivalent to a bridged-T network formed entirely of lumped impedance elements.

The said lengths of transmission line may all be coaxial lines and the said first and second lengths may be formed by a ring of transmission line.

One construction of the phase equaliser network in accordance with the present invention will now be described by way of example with reference to the accompanying drawings in which.

Figures 1, 2, 3, 4:
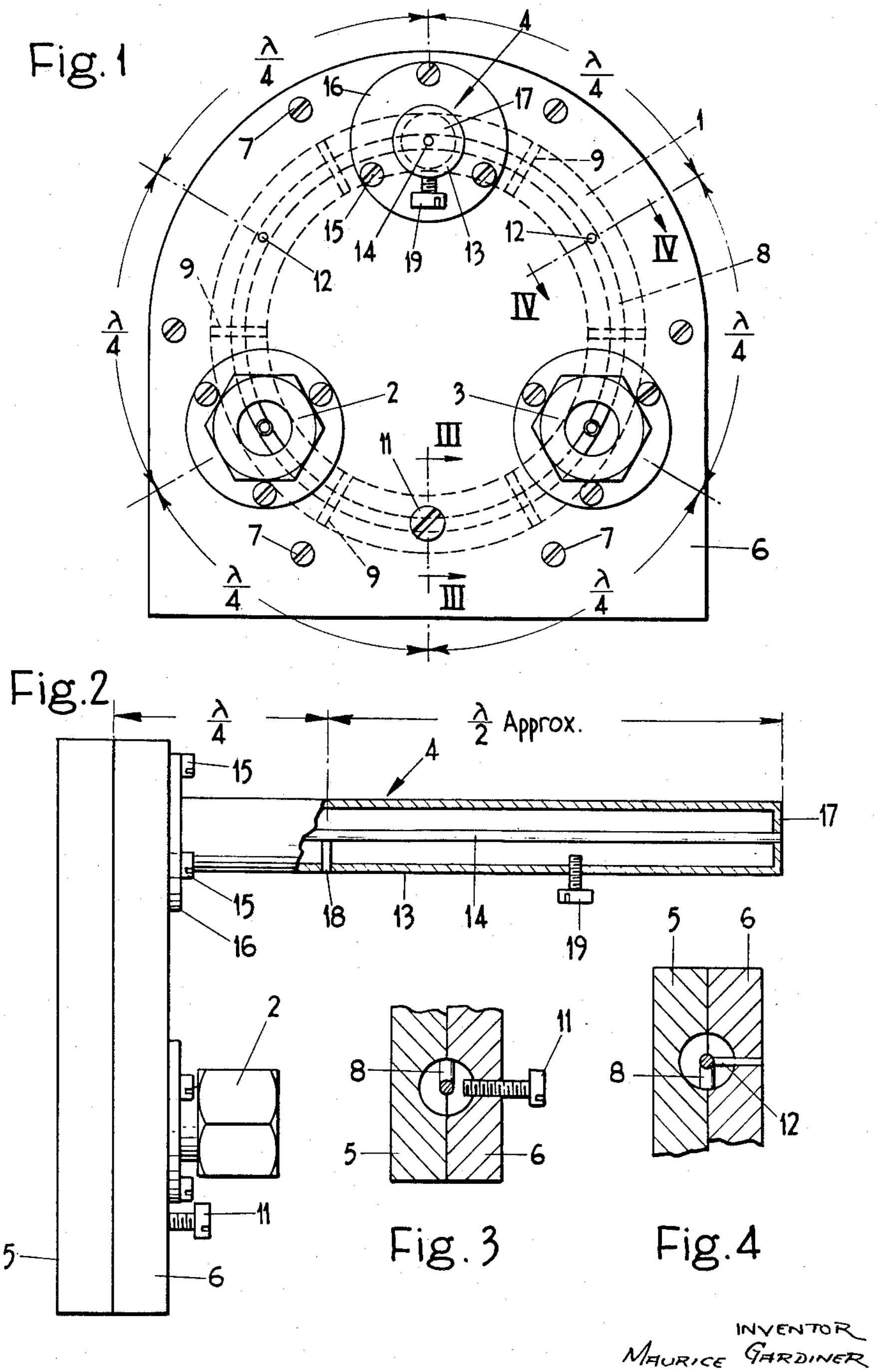
FIGURES 1 and 2 show respectively front and side elevations of the network.
FIGURES 3 and 4 show respectively cross sections at the lines III—III and IV—IV in FIGURE 1.

The phase equaliser network now to be described is for use at frequencies in the region of 2,000 megacycles per second and, referring now to FIGURES 1 and 2, comprises a ring 1 of coaxial transmission line to which are connected two coaxial connectors 2 and 3 and a stub 4 of coaxial transmission line. The coaxial ring 1 has an electrical length equal to one and a half wavelengths at the frequency at which the network is to be used and the two connectors 2 and 3 which constitute the input and output connectors of the network, are connected to the ring 1 at points spaced a half wavelength apart round the ring.

Two metal plates 5 and 6 are held together by means of screws 7 and the opposing faces of the plates 5 and 6 each has an annular recess of semi-circular cross section, these annular recesses in the two plates being in register with one another so that the two plates together constitute the outer conductor of the coaxial ring 1. The inner conductor 8 of the coaxial ring 1 is supported by discs 9 of electric insulating material, for example polyethyelene.

A lumped capacity is provided across the shorter section of the coaxial ring 1 between the connectors 2 and 3 at a point midway along that section. This capacity is formed by a screw 11 (see also FIGURE 3) which projects through the plate 6 into the space between the inner and outer conductors of the ring 1 of coaxial transmission line. It will be appreciated that since the electrical distance between the connectors 2 and 3 along the shorter section of the coaxial ring 1 is half a wavelength at the frequency at which the network is to be used, the screw 11 is spaced from each of the connectors 2 and 3 by a distance equal to a quarter wavelength.

Each of the sections of the coaxial ring 1 between the point of connection to the stub line 4, on the one hand, and the connectors 2 and 3, on the other hand, has a lumped inductance connected across it at a point midway along its length. Referring now also to FIGURE 4, each of these inductances is formed by a length of wire 12 which is secured, for example by soldering, to the plate 6 and to the inner conductor 8. It will be realised that each of the two wires 12 is placed a quarter wavelength from both the stub 4 and the adjacent connector 2 or 3.

The stub 4 comprises a tube 13 which constitutes the outer conductor of the transmission line and an inner conductor 14. The tube 13 is held in position by means of screws 15 which pass through a flange 16 on the end of the tube into the plate 6. The inner conductor 14 is connected, for example by soldering, at one end to the closed end 17 of the tube 13 and at the other end to the inner conductor 8 of the ring 1 of coaxial transmission line. The stub line 4 has an electrical length approximately equal to three quarters of a wavelength at the operating frequency of the network. At a point a quarter wavelength along the stub 4 a lumped inductance is connected across the stub, this inductance being formed by a length of wire 18 in a similar manner to the inductance provided by each of the wires 12. A screw 19 projects through the tube 13 into the space between the inner and outer conductors of the stub line 4 so as to form a lumped capacity connected across the stub.

Figure 5:
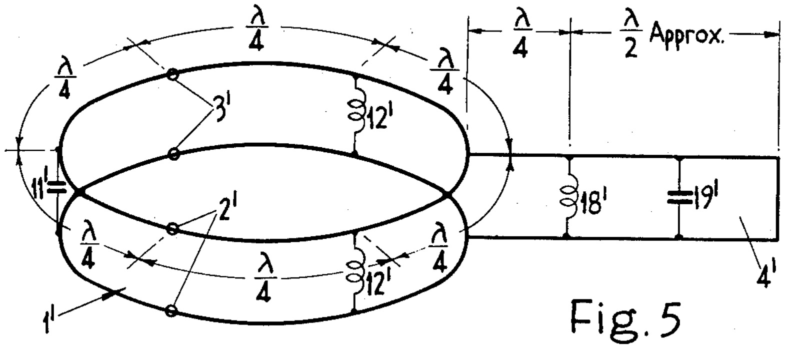
FIGURE 5 shows diagrammatically the electric circuit of the network.

FIGURE 5 of the accompanying drawings shows the electrical circuit of the network described above with reference to FIGURES 1 to 4. In FIGURE 5 the ring 1 of coaxial transmission line and the coaxial stub 4 are shown as two-conductor lines 1′ and 4′ respectively while the input and output connectors 2 and 3 are represented by pairs of terminals 2′ and 3′ respectively. Furthermore the capacities introduced by the screws 11 and 19 are shown as capacitors 11′ and 19′ while the inductances provided by the wires 12 and 18 are shown as inductors 12′ and 18′.

Figure 6:
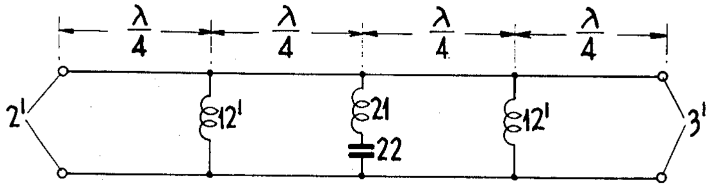
FIGURES 6, 7, 8 and 9 show equivalent circuits of parts of the network and, FIGURE 10 shows an equivalent circuit of the complete network.
Figure 7:
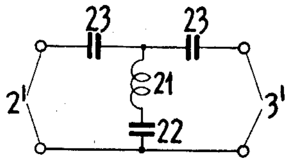

The position of the screw 19 is adjusted so that, at the frequency of use, it provides in conjunction with the short circuit at the end 17 of the stub 4 an effective capacity across the inductance provided by the wire 18 so as to form a parallel resonant circuit. Since, however, the wire 18 is spaced from the coaxial ring 1 by a distance equal to a quarter wavelength, the stub line 4 simulates a series resonant circuit as far as the ring 1 is concerned. That part of the circuit of FIGURE 5 corresponding to the longer section of the ring 1 of coaxial transmission line between the connectors 2 and 3 together with the stub line 4 can therefore, be redrawn as shown in FIGURE 6, the stub line 4 in this figure being represented by the series resonant circuit formed by an inductor 21 and a capacitor 22. It can be readily shown that the circuit of FIGURE 6 is equivalent to the circuit of FIGURE 7 which consists solely of lumped impedance elements, namely two capacitors 23 in addition to the inductor 21 and the capacitor 22.

Figure 8:
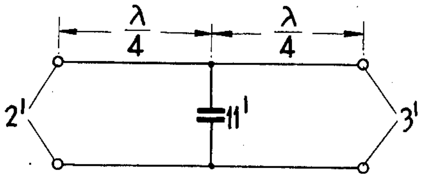
Figure 9:
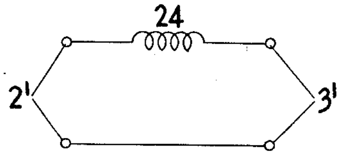
Figure 10:
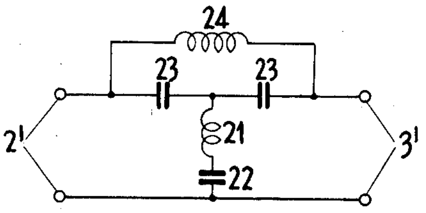

Similarly that portion of the circuit of FIGURE 5 which corresponds to the shorter section of the ring 1 of coaxial transmission line between the connectors 2 and 3 (which portion is shown separately in FIGURE 8)

may be replaced by a single lumped impedance element, namely an inductor 24, as shown in FIGURE 9. It follows, therefore, that the network formed entirely of lumped impedance elements that is electrically equivalent to the network described above with reference to FIGURES 1 to 4 is obtained by connecting in parallel the circuits of FIGURES 7 and 9, the resulting circuit being shown in FIGURE 10.

Although in the embodiment of the invention described above the ring 1 of coaxial line is of uniform characteristic impedance, this is not a necessary requirement and in fact different parts of the ring may have different values of characteristic impedance in order to enable the desired impedance of the equivalent circuit more readily to be realised.

In a modified arrangement the capacity formed by the screw 11 may be replaced by an inductance while the inductances formed by the wires 12 are replaced by capacities. In this case, the series arms of the equivalent circuit corresponding to FIGURE 10 contain inductors and the bridging arm contains a capacitor.

It will be appreciated that although a ring of coaxial transmission line is used in the embodiment of the invention described above, other configurations of line may be employed. Furthermore, the invention is not restricted to coaxial lines since other transmission lines, for example waveguides or strip-lines, may be used.

I claim:

1. A four terminal electric network that is electrically equivalent to a bridged-T network formed entirely of lumped impedance elements, comprising a pair of input terminals, a pair of output terminals, first and second lengths of two-conductor transmission line connected in parallel between the said input terminals and the said output terminals, a third length of two-conductor transmission line connected to the said second length of transmission line as a stub, a lumped impedance element connected between the conductors of the first line, at least one lumped impedance element connected between the conductors of the third line and at least one lumped impedance element connected between the conductors of each part of the second line on either side of the junction with the said third line.

2. An electric network according to claim 1 wherein said lengths of transmission line are all coaxial lines.

3. An electric network according to claim 2 wherein the first and second lengths of transmission line are formed by a ring of transmission line.

4. An electric network according to claim 3 wherein the third length of transmission line is arranged to simulate a series resonant circuit as far as the second length of transmission line is concerned.

5. An electric network according to claim 4 wherein all said lumped impedance elements are reactive impedances.

6. A four-terminal electric network that is electrically equivalent to a bridged-T network comprising a ring of transmission line, a length of transmission line which is connected as a stub to said ring of transmission line, input and output connections connected to said ring of transmission line, the input and output connections and the stub being equally spaced around said ring at intervals electrically equal to approximately a half wavelength at the frequency at which the network is to be used, three lumped reactive impedance elements connected across said ring of transmission line, these elements being electrically midway between respectively the input and output connections, the input connection and the stub and the output connection and the stub so as to be approximately a quarter wavelength therefrom at said frequency, and one or more lumped reactive impedance elements connected across said stub so that at the frequency at which the network is to be used the stub simulates a series resonant circuit at the junction between the stub and the ring of transmission line.

References Cited in the file of this patent

UNITED STATES PATENTS

| | | |
|---|---|---|
| 2,147,809 | Alford | Feb. 21, 1939 |
| 2,226,686 | Alford | Dec. 31, 1940 |
| 2,270,416 | Cork | Jan. 20, 1942 |
| 2,284,529 | Mason | May 26, 1942 |
| 2,414,115 | Mason | Jan. 14, 1947 |
| 2,515,061 | Smith | July 11, 1950 |
| 2,527,549 | Herring | Oct. 31, 1950 |
| 2,580,592 | Pound | Jan. 1, 1952 |
| 2,584,600 | MacKimmie | Feb. 5, 1952 |